(12) United States Patent
Haddad et al.

(10) Patent No.: US 10,325,256 B2
(45) Date of Patent: Jun. 18, 2019

(54) ANCHOR TAGS FOR USE WITH INDIVIDUAL SIGNER PROFILE CARDS

(71) Applicant: Bank of America Corporation, Charlotte, NC (US)

(72) Inventors: Linda Haddad, Concord, CA (US); Diane Fowlar, Concord, CA (US)

(73) Assignee: Bank of America Corporation, Charlotte, NC (US)

( * ) Notice: Subject to any disclaimer, the term of this patent is extended or adjusted under 35 U.S.C. 154(b) by 108 days.

(21) Appl. No.: 15/670,213

(22) Filed: Aug. 7, 2017

(65) Prior Publication Data
US 2019/0043047 A1    Feb. 7, 2019

(51) Int. Cl.
*G06Q 20/38* (2012.01)
*H04L 29/08* (2006.01)
*G06Q 10/10* (2012.01)

(52) U.S. Cl.
CPC ......... *G06Q 20/3825* (2013.01); *G06Q 10/10* (2013.01); *H04L 67/306* (2013.01)

(58) Field of Classification Search
CPC ... G06Q 20/3825; G06Q 10/10; H04L 67/306
See application file for complete search history.

(56) References Cited

U.S. PATENT DOCUMENTS

| | | | |
|---|---|---|---|
| 6,085,976 A * | 7/2000 | Sehr | ............ G06Q 10/02 235/380 |
| 6,968,317 B1 | 11/2005 | Wallace et al. | |
| 7,051,206 B1 | 5/2006 | Giest et al. | |
| 7,170,391 B2 | 1/2007 | Lane et al. | |
| 7,472,275 B2 | 12/2008 | Arnouse | |
| 7,617,970 B2 | 11/2009 | Carr et al. | |
| 7,636,499 B1 | 12/2009 | Arant et al. | |
| 7,636,500 B1 | 12/2009 | Arant et al. | |

(Continued)

OTHER PUBLICATIONS

Neubauer et al., "Digital Signatures with Familiar Appearance for e-Government Documents: Authentic PDF", 2006, Proceedings of the First International Conference on Availability, Reliability and Security (ARES'06), pp. 1-8. (Year: 2006).*

(Continued)

*Primary Examiner* — Matthew Smithers

(74) *Attorney, Agent, or Firm* — Weiss & Arons LLP; Michael A. Springs, Esq.

(57) ABSTRACT

Systems and methods for an individual floating signer profile card compatible with anchors tags are provided. The individual floating signer profile card may include a plurality of personally identifiable information elements associated with one individual and a plurality of text fields. The individual floating signer profile card may further include a plurality of anchor tags. Each of the anchor tags may be mapped to a specific field within the plurality of text fields. When an individual enters an element of personally identifiable information into a text field included in the plurality of text fields and the signer profile card is saved within a machine-readable memory as a digital signer profile card, each element of personally identifiable information included in the plurality of text fields may be transferred to a section of a database corresponding to the anchor tag to which the element of personally identifiable information is mapped.

5 Claims, 4 Drawing Sheets

(56) References Cited

U.S. PATENT DOCUMENTS

| | | | |
|---|---|---|---|
| 7,778,902 B2 | 8/2010 | Wallace et al. | |
| 8,059,858 B2 | 11/2011 | Brundage et al. | |
| 8,799,088 B2 * | 8/2014 | Rothschild | G06Q 20/04 |
| | | | 235/380 |
| 9,481,197 B2 | 11/2016 | Eckel et al. | |
| 9,536,065 B2 | 1/2017 | Bouse et al. | |
| 2002/0042879 A1 * | 4/2002 | Gould | G06Q 20/341 |
| | | | 713/176 |
| 2006/0157559 A1 * | 7/2006 | Levy | G06K 17/00 |
| | | | 235/380 |
| 2008/0030800 A1 * | 2/2008 | Matsukawa | H04N 1/00244 |
| | | | 358/474 |
| 2009/0045257 A1 * | 2/2009 | Maus | G06K 19/025 |
| | | | 235/382 |
| 2011/0093777 A1 * | 4/2011 | Dunn | G06F 17/243 |
| | | | 715/268 |
| 2013/0318426 A1 * | 11/2013 | Shu | G06F 17/243 |
| | | | 715/226 |
| 2015/0150090 A1 * | 5/2015 | Carroll | G06F 21/316 |
| | | | 726/3 |
| 2015/0172463 A1 * | 6/2015 | Quast | H04M 3/4936 |
| | | | 379/88.01 |
| 2016/0048845 A1 | 2/2016 | Batista De Almeida Fonseca | |
| 2016/0142397 A1 | 5/2016 | Froelich et al. | |
| 2017/0103230 A1 * | 4/2017 | O'Brien | G06F 21/6245 |
| 2018/0329873 A1 * | 11/2018 | Butyugin, IV | G06F 17/2247 |

OTHER PUBLICATIONS

Li et al., "AuthPaper: Protecting Paper-based Documents and Credentials using Authenticated 2D Barcodes", 2015, IEEE, pp. 7400-7406. (Year: 2015).*

"Anchors," https://www.w3.org/MarkUp/1995-archive/Elements/A.html, Retrieved on Jul. 27, 2017.

* cited by examiner

I. ACCOUNT INFORMATION
Select One: ☐ Update (Add/Delete) Signers (existing accounts only)
Account # (If new account, Bank will complete):
Account Holder LEGAL NAME
(Must match Federal income tax return)

Signer Linda
○ Acct 1
○ Acct 2

204 —

I. ACCOUNT INFORMATION
Select One: ☐ Update (Add/Delete) Signers (existing accounts only)
Account # (If new account, Bank will complete):
Account Holder LEGAL NAME
(Must match Federal income tax return)

Signer Paula
○ Account 1
○ Account 2
○ Account 3

I. ACCOUNT INFORMATION

Select One: ☐ Update (Add/Delete) Signers (existing accounts only)

Account # (If new account, Bank will complete):

Account Holder LEGAL NAME (Must match Federal income tax return)

Signer Cary
○ Account 2
○ Account 3

↑

208 —

I. ACCOUNT INFORMATION

Select One: ☐ Update (Add/Delete) Signers (existing accounts only)

Account # (If new account, Bank will complete):

Account Holder LEGAL NAME (Must match Federal income tax return)

Signer John
○ Account 3

300

|  | Deposit Account Documentation<br>Signer Profile Card |
|---|---|

Signer Profile Card

I. Signer Information section — 301

302 {
- Title: | Full Name: — 304
- Residential address: — 306
- Date of Birth: MM/DD/YYYY — 308
- Government Issue ID (Select One): ☐ Driver's License ☐ Social Security Number ☐ Passport Number | ID Number 310 {
- E-mail Address: — 312 | ID — 314
- Signature: — 316

II. Entity Information Section — 317

318 {
- Entity name:
- Tax ID: — 320
- Entity Address: — 322

III. Account List and Entitlement Table Section — 324

| Account Number | Resolution/ Authorized Signer | Designated Signer | Check only Signer | Electronic Payments Approver | Online Portal Primary Admin |
|---|---|---|---|---|---|
| 326 | 328 | 330 | 332 | 334 | 336 |
|  |  |  |  |  |  |
|  |  |  |  |  |  |

Authorized signer (give permission to add this person as signer on this entity) — 338

FIG. 3

ANCHOR TAGS FOR USE WITH INDIVIDUAL SIGNER PROFILE CARDS

FIELD OF TECHNOLOGY

This invention relates to signer profile cards.

BACKGROUND OF THE DISCLOSURE

Conventionally, when an entity opened a database unit associated with a financial account, a signature card was assigned to the database unit. The signature card included personally identifiable information relating to database unit users with signatory permission.

Typically, each user with signatory permission has been required to sign the signature card, and to pencil in personally identifiable information onto the signature cards to verify his or her identity. Subsequent signers may have been able to view personally identifiable information which was previously penciled into the signature card by earlier signers.

Additionally, upon completion of receipt of signatures and personally identifiable information from all required signatories, the signature card has been scanned and stored as an image in an image database. Image databases are cumbersome, expensive and slow. Storage of the card as an image also exposes the personally identifiable information to a non-secure channel. For example, the personally identifiable information may become exposed to an operator verifying an official document against the signature or information of the card.

Also, each signer may be required to sign numerous signature cards for each database unit with which the signer is associated. Signing and entering numerous signature cards may encumber the individuals required to sign the signature cards.

Similarly, when a change is made to a signature card, additional papers are attached to the previously stored image. The additional papers include information for adding or removing signers. This has complicated the process of reviewing the signature cards in order to ascertain the appropriate signers. Additionally, when a signer left an entity, his or her personally identifiable information remained on the signature card. Maintaining personally identifiable information relating to legacy signers has generated unnecessary exposure of the identity information.

SUMMARY OF THE DISCLOSURE

An individual floating signature card compatible with anchor tags is provided. The individual floating signature profile card may include a plurality of personally identifiable information elements. The plurality of personally identifiable information elements may be associated with one individual.

The individual floating signature profile card may also include a plurality of text fields. The individual floating signature card may also include a plurality of anchor tags. Each of the anchor tags may be mapped to a specific field within the plurality of text fields.

The one individual may enter an element of personally identifiable information into a text field. The text field may be mapped to an anchor tag. Upon entry of the personally identifiable information, the signer profile card may be saved within a machine-readable memory as a digital signer profile card. The digital signer profile card may be assigned to the one individual.

Upon storing of the digital signer profile card within the machine-readable memory, each element of personally identifiable information, which had been entered into a text field on the card by the one user, may be transferred into a section of a database. Each section of the database may correspond to an anchor tag. Each element of personally identifiable information may be transferred to a section of the database which corresponds to the anchor tag to which the element of personally identifiable information is mapped.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 2 shows illustrative signature cards in accordance with embodiments of the invention; and FIG. 3 shows an illustrative signer profile card in accordance with embodiments of the invention.

DETAILED DESCRIPTION OF THE DISCLOSURE

Figure 1:
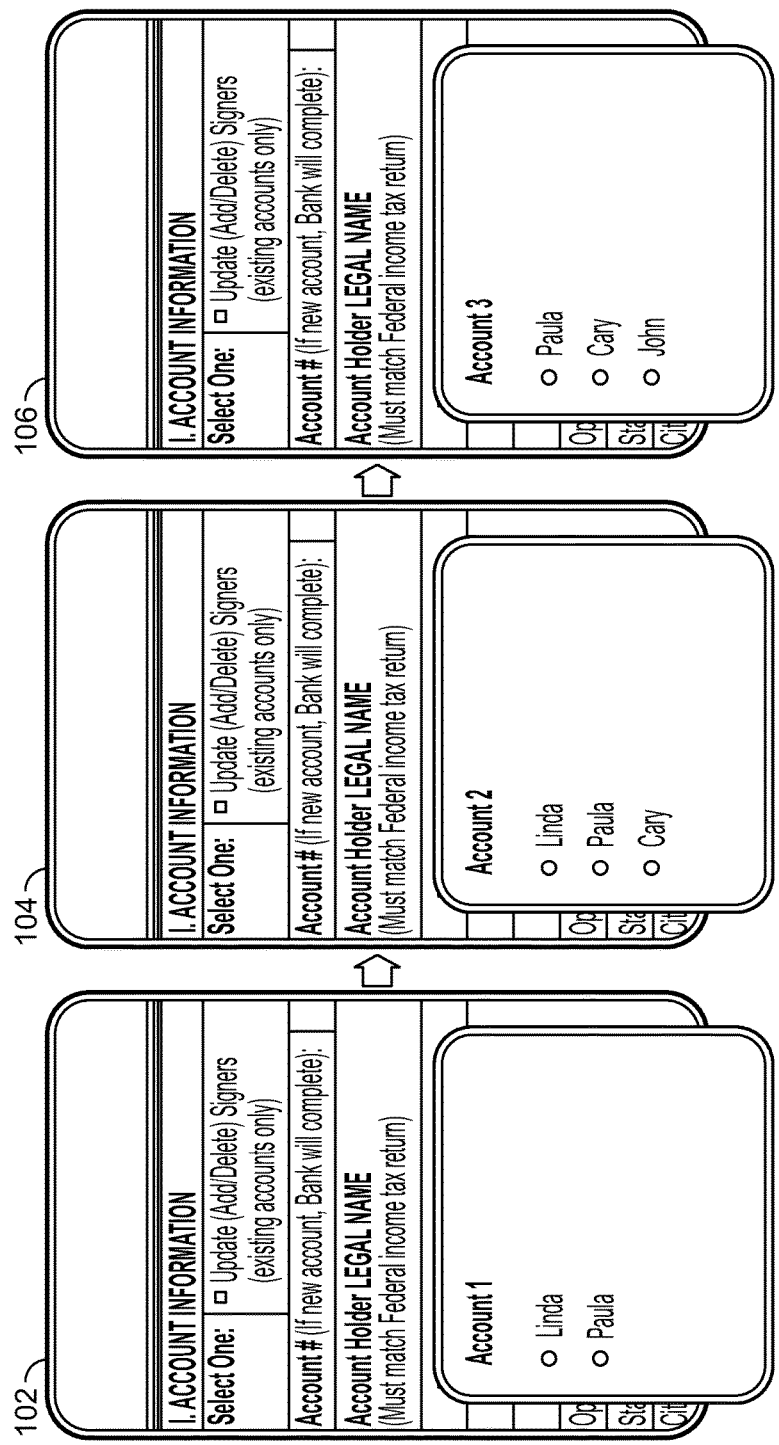
FIG. 1 shows prior art signature cards.

A method for using individual floating signer profile cards compatible with anchor tags is provided. The method may include receiving a plurality of personally identifiable information elements. The personally identifiable information elements may be associated with one individual.

At times, the one individual may enter the personally identifiable information onto a paper signer profile card. Other times, the individual may enter the personally identifiable information into an electronic signer profile card. Yet other times, the individual may enter the personally identifiable information using both electronic and non-electronic mechanisms.

In embodiments where information is entered into an electronic signer profile card, an anchor tag, such as an html anchor tag, may be associated with each text field. The anchor tags may be used to store, in a structured manner, the information that has been entered into the text field. Each element of information may be stored in a section of a database that corresponds to the anchor tag that is associated with the element of information.

The method may include mapping each of the text fields to an anchor tag. The mapping may be executed prior to a user entering the information into the text field. The mapping may be executed after the user enters the information into the text field.

It should be appreciated that in some embodiments, some text fields may be mapped to anchor tags, while other text fields may not be mapped to anchor tags. The text fields that may be mapped to anchor tags may include indexing data. The indexing data may be used to index the signer profile cards. A user—such as an operator, entity employee, teller, etc.—may be able to search for (and retrieve) information and/or data included in the signer profile card, by using the indexed data. For example, if a text field—signer name, has an anchor tag associated with it, the document may be searched by the signer name.

The method may include saving the signer profile card within a machine-readable memory. The signer profile card may be stored as a digital signer profile card. In some embodiments, the signer profile card may be stored as coded alphanumeric data rather than as an image.

Digital documents may reduce the exposure of personally identifiable information. When using a digital document, the user, for example, may only have access to one select element of personally identifiable information, such as a signature specimen field. The user may review the current signature specimen (for example, a signature on a check to be deposited) to the signature specimen field included in the database unit. The user may be privy only to one field—e.g., the signature specimen field—of one of the signers. This improves upon a teller having access to all personally identifiable information of all signatories on a specific account.

In certain embodiments, such as transactions that require heightened security, the user, or an administrative user, may request, receive and/or grant permission to view more than one data field, e.g., a signature specimen field and also a driver's license number. The manager, administrator, operator or teller may perform a verification of whether the current signature specimen and the current driver's license, such as one that the signer is currently carrying, match the stored signature specimen and the stored driver's license number. In some embodiments, a system according to the functioning of the principles of the invention, may perform the verification without human intervention. Human intervention may be used in some scenarios, for example, when the system cannot verify signer information on an official document.

The method may include allocating a plurality of sections in a database for each of the anchor tags. The allocating may be executed prior to the user entering information into the text field or after the user enters information into the text field. Allocating a section of the database for each of the anchor tags may enable structured storage of the information included in the signer profile cards.

The method may include transferring each element of personally identifiable information to an allocated database section. The allocated database section may correspond to an anchor tag. The anchor tag may be mapped to a text field. The text field may include the element of personally identifiable information.

When the user receives an official document signed by the one individual, the user may be granted authorization to retrieve at least one element of personally identifiable information. The one element of personally identifiable information may relate to the one individual identified in the database in order to verify the authenticity of the official document.

In some embodiments, the system may be integrated with audio/visual technology. The audio/visual technology may be used to verify the identity of a signer. The audio/visual technology may enable comparison of a physical item, such as a driver's license, to a stored driver's license. Additionally, audio/visual technology may be used capture facial characteristics and/or biometric data of the signer. The current facial characteristics and/or biometric data may be compared to previously stored facial characteristics and/or biometric data relating to the signer. The comparison may be performed by an automated system. Upon completion of the comparison, the user may be notified whether or not the signer has been verified. Transmitting a "verified" or "unable to verify" signal as opposed to transmitting personally identifiable information may reduce the exposure of the personal information.

At least one anchor tag included in the plurality of anchor tags, may correspond to a passport number, a license number, a home address and/or a date of birth associated with the one individual.

In some embodiments, the system may utilize OCR (optical character recognition) to compare official documents to previously captured segments of data. For example, a signature specimen on a check may be automatically compared to the previously stored specimen. When the system verifies that the current signature specimen matches the previous signature specimen with a confidence level that exceeds a predetermined threshold of confidence, the system may transmit an approval.

In some embodiments, a driver's license number may be compared to a previously stored driver's license number. When the system verifies that the current driver's license number matches the stored driver's license number with a confidence level that exceeds a predetermined threshold of confidence, the system may transmit an approval.

In some embodiments, the data retrieved from the signer profile cards may be linked to an external database. The external database may include personal data relating to employees and clients. Linking the data to the database may enable real-time monitoring of know your customer information, such as driver's license number, passport number, home address, or any other suitable personally identifiable information. Other suitable personally identifiable information may include social security number. Other suitable personally identifiable information may include date of birth. It should be appreciated that the linked data may enable verification without human intervention. The retrieved data may be compared to the data in real-time. Removing the human element from personal data verification may further limit the exposure of the personally identifiable information.

In some embodiments, a completed signer profile card may initially be scanned into the system as an image. The image may then be processed. Using OCR technology systems, such as Kofax™ or Docusign™ or other suitable technology systems, the image may be transformed into coded data. Upon storage of the data, the image may be discarded.

In some embodiments, only data associated with an anchor tag may be stored. Other data, that may not be associated with an anchor tag, such as user instructions, may be discarded with the image. Discarding unnecessary images and data may conserve database bandwidth and facilitate improvement of the quality of the data that are saved in the database.

In some embodiments, a method for phasing into a digital signer profile card system is provided. The method may include a first phase.

The method may include, in the first phase, receiving a paper signer profile card. The first phase may further include scanning the paper signer profile card and then extracting data and images from the signer profile card. The extracting of the data and images may be based on a plurality of anchor tags associated with the signer profile card.

The method may further include, in the first phase, storing the data and images in a designated signer profile card database. The method may further include discarding the scanned paper signer profile card and synchronizing an online portal with the designated signer profile card database to enable modifications to be made to the signer profile card data saved in the database.

The method may include a second phase. The method may include, in the second phase, creating a digitized signer profile card within the online portal and enabling receipt of electronic signatures within the online portal.

The method may further include, in the second phase, enabling image capture of identification information at the online portal. The method may further include pre-filling data into the digitized signer profile card, using communications with an external database, based on a first element of data entered into the signer profile card.

The method may include a third phase. The method may include, in the third phase, removing the capability to scan paper signer profile cards.

Illustrative embodiments of apparatus and methods in accordance with the principles of the invention will now be described with reference to the accompanying drawings, which form a part hereof. It is to be understood that other embodiments may be utilized and that structural, functional and procedural modifications may be made without departing from the scope and spirit of the present invention.

FIG. 1 shows prior art signature cards 102, 104 and 106. Signature cards 102, 104 and 106 may each be assigned to a specific account. Signature card 102 may be associated with account 1. Signature card 104 may be associated with account 2. Signature card 106 may be associated with account 3.

Signers Linda and Paula may be included on account 1. Signers Linda, Paula and Cary may be included on account 2. Signers Paula, Cary and John may be included on account 3.

It should be appreciated that Paula may be included on signature cards 102, 104 and 106; Linda may be included on signature cards 102 and 104; Cary may be included on signature cards 104 and 106; and John may be included on signature card 106.

Upon receipt of a signature and/or other personally identifiable information from Linda on signature card 102, signature card 102 may be transmitted to Paula. When Paula enters her personally identifiable information into signature card 102, Paula may be able to view Linda's personally identifiable information.

Also, Linda, Paula and Cary may be required to enter personally identifiable information multiple times into signature cards 102, 104 and/or 106. This may encumber the individuals required to sign the signature cards.

When a change may be made a signature card additional papers may be attached to the previously stored signature card. The additional papers may include information for adding or removing signers. Additionally, if Linda, Paula, Cary or John leaves the entity associated with accounts 1, 2 and 3, the personally identifiable information associated with him/her may remain on one or more signature cards.

FIG. 2 shows illustrative signer profile cards 202, 204, 206 and 208 in accordance with principles of the invention. Each of signer profile cards 202, 204, 206 and 208 may be specific to an individual.

Signer profile card 202 may be specific to signer-Linda. Signer Linda may be associated with account numbers one and two.

Signer profile card 204 may be specific to signer-Paula. Signer Paula may be associated with account numbers one, two and three.

Signer profile card 206 may be specific to signer-Cary. Signer Cary may be associated with account numbers two and three.

Signer profile card 208 may be specific to signer-John. Signer John may be associated with account number three.

It should be appreciated that, by using signer profile cards 202, 204, 206 and 208, personally identifiable information need not be shared between signers. Also, a signer may only be required to sign one signer profile card, as opposed to signing numerous cards.

Additionally, if a signer is removed and/or added to an account, the change may be made within his or her signer profile card. A new signer profile card may be issued, or the signer profile card may be amended to conform to the change.

FIG. 3 shows singer profile card 300. In some embodiments, signer profile card may be electronic. In other embodiments, signer profile card may be non-electronic.

Signer profile card 300 may include section 301—Signer Information section. Signer Information section 301 may include text entry fields for entry of personally identifiable information. The text entry fields, included in section 301, may include title 302, full name 304, residential address 306, date of birth 308, government issued identification 310, e-mail address 312, ID 314 and signature 316. ID 314 may be an internal entity identification number. Each of the text entry fields may be mapped to an anchor tag. The anchor tag may define the contents of the text entry field. The anchor tag may be used to extract information from signer profile card 300 and store the information in a structured manner within a database.

Signer profile card 300 may include Entity Information section 317. Entity Information section 317 may include text entry fields relating to the entity with which the signer is associated. The text entry fields, relating to Entity Information section 317, may include entity name 318, tax ID 320 and entity address 322. Each of the text entry fields may be mapped to an anchor tag. The anchor tag may define the contents of the text entry field. The anchor tag may be used to extract information from signer profile card 300 and store the information in a structured manner within a database.

Signer profile card 300 may include section 324—Account List and Entitlement Table section. Section 324 may include a table. The table may include accounts associated with the signer. The table may include columns: 326—account number, 328—resolution/authorized signer, 330—designated signer, 332—check only signer, 334—electronic payments approver and 336—online portal primary administrator. Each of the cells within the columns may be mapped to an anchor tag. The anchor tag may define the contents of the cell. The anchor tag may be used to extract information from signer profile card 300 and store the information in a structured manner within a database.

Signer profile card 300 may include text entry field 338. Text entry field 338 may be configured to receive a signature from an administrator. The received signature may give permission to add the person as a signer for this account of the entity. Text entry field 338 may also be mapped to an anchor tag. The anchor tag may define the contents of the field. The anchor tag may be used to extract information from signer profile card 300 and store the information in a structure manner within a database.

It should be appreciated that, for example, Signer Information section 301 may not be associated with an anchor tag, while entity name 318 may be associated with an anchor tag.

Thus, methods and apparatus for anchor tags for use with individual floating signer profile cards have been provided. Persons skilled in the art will appreciate that the present invention can be practiced by other than the described embodiments, which are presented for purposes of illustration rather than of limitation. The present invention is limited only by the claims that follow.

What is claimed is:

1. A method for phasing into a digital signer profile card system, the method comprising:
   in a first phase:

receiving a paper signer profile card;

scanning the paper signer profile card;

extracting data and images from the signer profile card, based on a plurality of anchor tags associated with the signer profile card;

storing the data and images in a designated signer profile card database;

discarding the scanned paper signer profile card; and synchronizing an online portal with the designated signer profile card database to enable modifications to be made to the signer profile card data;

in a second phase:

creating a digitized signer profile card at the online portal;

enabling receipt of electronic signatures at the online portal;

enabling image capture of identification information at the online portal; and pre-filling data into the digitized signer profile card, using communications with an external database, based on a first element of data entered into the signer profile card; and in a third phase:

removing the capability to scan paper signer profile cards.

2. The method of claim 1, wherein at least one anchor tag of the plurality of anchor tags, corresponds to a passport number.

3. The method of claim 1, wherein at least one anchor tag of the plurality of anchor tags, corresponds to a license number.

4. The method of claim 1, wherein at least one anchor tag of the plurality of anchor tags, corresponds to a home address.

5. The method of claim 1, wherein at least one anchor tag of the plurality of anchor tags, corresponds to a date of birth associated with the one individual.

* * * * *